US006098648A

United States Patent [19]

Bertoia

[11] Patent Number: 6,098,648

[45] Date of Patent: Aug. 8, 2000

[54] INTAKE FOR WHIRLPOOL-TYPE BATHTUB

[75] Inventor: Giuliano Bertoia, Arzene, Italy

[73] Assignee: Domino S.p.A., Pordenone, Italy

[21] Appl. No.: 09/160,800

[22] Filed: Sep. 25, 1998

[30] Foreign Application Priority Data

Sep. 25, 1997 [IT] Italy ................................ PN97A0052

[51] Int. Cl.[7] ................................................ F16K 17/00

[52] U.S. Cl. ................................ 137/112; 4/541.2; 4/668; 137/113

[58] Field of Search ............................ 4/541.2, 668, 688; 137/112, 113, 114

[56] References Cited

U.S. PATENT DOCUMENTS

| | | | |
|---|---|---|---|
| 3,556,124 | 1/1971 | Walton | 137/112 |
| 4,729,406 | 3/1988 | Frentzel | 137/112 |
| 5,499,406 | 3/1996 | Chalberg et al. | 4/541.2 |
| 5,682,624 | 11/1997 | Ciochetti | 4/541.2 |

*Primary Examiner*—Stephen M. Hepperle
*Attorney, Agent, or Firm*—Wenderoth, Lind & Ponack, L.L.P.

[57] ABSTRACT

An intake for a bathtub with recirculates water, such as a whirlpool-type tub, includes a water inlet, an interior portion and an outlet that is adapted to be connected to a recirculating pump, so that water can flow from the tub, in through the inlet, through the interior and to the outlet to be recirculated by the pump. A vent communicates with the interior, and extends outside of the interior for communication with ambient air. A shutter is provided that is capable of being switched from a first condition, in which the outlet communicates with the vent, to an operating condition, in which, when a flow of water is caused toward the outlet, the shutter substantially shuts the vent. The shutter is adapted to switch from the operating condition to the first condition when the flow of water falls below a predetermined threshold value so as to enable ambient air to enter the interior through the vent, causing the recirculating pump to become unprimed. In this way, clogging of the water inlet automatically causes the deactivation of the recirculating pump.

4 Claims, 1 Drawing Sheet

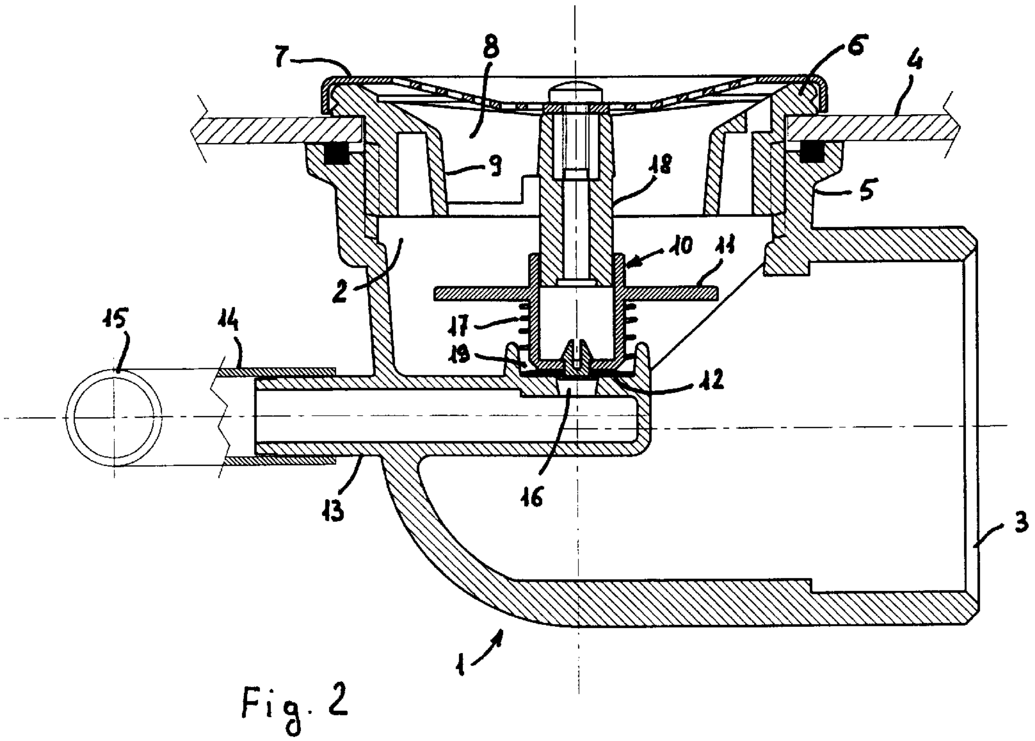
Fig. 2
Fig. 1
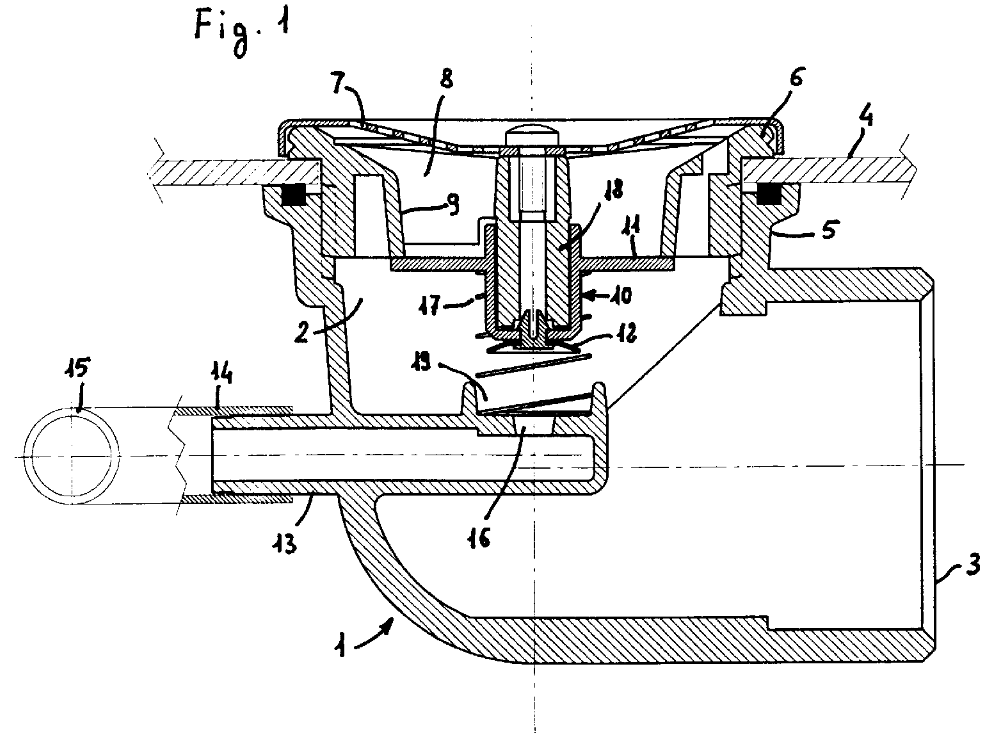

INTAKE FOR WHIRLPOOL-TYPE BATHTUB

BACKGROUND OF THE INVENTION

1. Field of the Invention

The present invention relates to an intake mouth for a whirlpool-type or similar type of bathtub. The present invention is adapted to prevent accidents from occurring such as may be brought about by hair remaining trapped in the intake and the consequences resulting therefrom under the circumstances, which may involve such serious consequences as drowning.

2. Description of the Prior Art

It is generally known that a water recirculation flow is generated in whirlpool-type bathtubs. A pump takes water from the interior of the tub through an intake mouth and sends the water to a plurality of jet nozzles which, after mixing the water with air, again eject the water under pressure into the interior of the tub.

In order to minimize the likelihood of the above-referenced accidents from occurring due to hair or other materials remaining trapped at the front of a grill at the intake mouth, a number of solutions have been proposed. These involve, for example, the use of floats and/or electric or magnetic switches for detecting and reacting to possible clogging conditions of the intake mouth and cutting off the operation of the recirculating pump. These types of solutions, however, are undesirably complicated, expensive and not very reliable, considering the criticality of the operation of the component parts used in connection therewith.

A simpler and lower-cost solution is described WO 96/18335. This solution provides for a part of the water flow taken in through the intake mouth to pass through a central tube which has a reduced cross-sectional area in order to normally balance the weight of the water column present in a vent pipe connected to the intake side of the recirculating pump. When the intake mouth becomes frontally clogged by trapped hair or the like, in positional correspondence with the central tube, the vent pipe becomes empty, discharging the water contained therein. It then starts conveying air toward the suction or intake side of the pump, and as a result the pump becomes unprimed, i.e. deactivates. This then allows for the foreign matter that led to the clogging to be conveniently removed.

This solution allows for the pump to be controlled in a simple manner. However, the solution also implies rather serious drawbacks. In fact, the solution of WO 96/18335 is only capable of detecting or identifying foreign matter that remains trapped in correspondence of a reduced frontal surface area of the intake valve, i.e. the surface area that practically corresponds to the cross-sectional area of the central tube. On the other hand, if the contrary case occurs, that is, if the foreign matter remains trapped along the remaining portions of the front surface of the intake mouth, this condition substantially fails to be identified or detected. Accordingly, the intake mouth is only effective under certain conditions, and on the whole turns out to be undesirably unsafe.

SUMMARY OF THE INVENTION

In view of the above, it is a primary object of the present invention to provide an intake mouth for a whirlpool-type and similar bathtubs that is particularly simple, low in cost and reliable in construction, and which at the same time is capable of constantly operating in a substantially safe manner under any and all operating conditions.

According to the present invention, this object is achieved by an intake for a bathtub comprising a water inlet, an interior and an outlet adapted to be connected to a pump. A flow of water can then flow from the inlet, through the interior, to the outlet. A vent communicates with the interior and extends outside thereof for communicating with ambient air. A shutter is capable of being switched from a first condition, in which the outlet communicates with the vent, to an operating condition, in which, when a flow of water is caused toward the outlet, the shutter substantially shuts the vent. The shutter is adapted to switch from the operating condition to the first condition when the flow of water falls below a predetermined threshold value so as to enable ambient air to enter the interior through the vent.

The shutter preferably comprises a movable member biased by a thrust or biasing member such as a spring to the first condition and a sensor adapted to be actuated by the flow of water to displace the movable member against the force of the spring to the operating condition. The vent preferably comprises a calibrated opening, and the shutter preferably further comprises an elastic membrane for closing the calibrated opening. The sensor preferably comprises a member which closes the inlet when the movable member is in the rest position.

BRIEF DESCRIPTION OF THE DRAWINGS

Additional objects, features and advantages of the present invention will become apparent from the following description, presented by way of a non-limiting example, and with reference with the accompanying drawings, in which:

FIG. 1 is a schematic cross-sectional view of a preferred embodiment according to the present invention in a rest position; and FIG. 2 is a schematic cross-sectional view of the preferred embodiment of the present invention similar to FIG. 1, but in an operating position.

DETAILED DESCRIPTION OF THE PREFERRED EMBODIMENT

An intake mouth according to the present invention comprises a hollow body 1 having at least an inlet opening 2 adapted to communicate with the interior of a whirlpool-type bathtub 4, and at least an outlet opening 3 adapted to be connected to the suction side of at least a recirculation pump. The recirculation pump is not illustrated for reasons of greater simplicity of the description, and is understood as being associated, in a per se known manner, with a water recirculating circuit which also includes water jet spray nozzles as required in order to produce a swirling and massaging action of the bath, for instance of the type described in EP-A-0 560 097.

An opening 2 of the hollow body 1 is provided in correspondence with a threaded abutment 5. A threaded ring-nut 6 can be screwed to the threaded abutment 5 so as to clamp the edge of a corresponding assembly aperture provided in the tub 4 between the threaded abutment 5 and the threaded ring-nut 6. The ring-nut 6 has a peripheral wall 9 which defines an inlet 8 of the intake mouth. The front side of the ring-nut 6 communicates with the interior of the bathtub 4 through a perforated screening grill 7. The perforated grill 7 is preferably screwed onto the ring-nut 6. The perforated grill 7, furthermore, carries a central stem 18 which protrudes toward the interior of the body 1.

A moving member 10 is axially slidable on the stem 18. The moving member 10, furthermore, carries a hydraulically operated sensor, in this case embodied by a discoidal pan or flange 11, but may be any other hydraulically operated sensor. The sensor 11 is preferably integral, i.e. in a single piece construction with, the moving member 10. The moving member 10 furthermore carries, preferably in correspondence with a rear free end portion thereof, at least a shutter 12. The shutter 12 may be of any appropriate type for the given purpose, but is preferably an elastic membrane in the shape of a suction cup.

The intake further has a vent pipe 13 extending into the interior of the hollow body 1, the vent pipe 13 preferably being made integral with the hollow body 1. On one side of the hollow body 1, the vent pipe 13 extends outwardly, connecting with tubing 14 so as to extend upwards. On the other side, the vent pipe 13 extends into the hollow body 1 to a position contiguous with the stem 18. In particular, the tubing 14 has a free end portion 15 which communicates with the outside ambient environment, and is arranged above the highest allowable water level inside the tube 4. Thus, it is normally exposed to the air. On the opposite side, the vent pipe 13 is adapted to communicate with the interior of the hollow body 1, and thus with the suction side of the recirculation pump, this communication being through at least a calibrated opening 16 which is axially aligned with the stem 18.

A calibrated thrust member 17 is adapted to normally maintain the moving member 10 in the first operating position thereof, which position is axially spaced from the calibrated opening 16 as illustrated in FIG. 1. In this position, the shutter 12 is disengaged from the calibrated opening 16, and the pan or sensor 11 at least partially shuts the inlet 8 of the intake mouth. The thrust member 17 is preferably formed by a compression spring which is positioned to partially surround the moving member 10 and which has an end portion arranged to abut against the pan or sensor 11. The opposite end of the thrust member 17 rests in a seat 19 that is provided on the outside of the vent pipe 13 around the calibrated opening 16.

As will be described in greater detail below, the moving member 10 is adapted to move into a second operating position, or second operating condition, as illustrated in FIG. 2. In this condition, the shutter 12 substantially shuts the calibrated opening 16, while the pan or sensor 11 substantially opens the inlet 8 of the intake mouth.

In the rest position illustrated in FIG. 1, the recirculating pump is inactive. In this position, the thrust member 17 maintains the moving member 10 in an axial position in which the shutter 12 is disengaged from the calibrated opening 16 of the vent pipe 13. It should be noted that the vent pipe 13, along with the tubing 14 associated therewith, can substantially fill up with water due to the effect of its communicating passages, when the tub 4 is filled with water up to a pre-determined level, in a per se known manner.

When the recirculating pump is started for the purpose of supplying water to the water jet spouts of the bathtub, thereby bringing about a swirling massage action in the bathtub, a negative pressure occurs at the outlet 3 of the hollow body 1. This negative pressure attracts the sensor 11, and thus the entire moving member 10 along therewith. The moving member 10 is thus moved axially away from the inlet 8. This displacement occurs by overcoming the force of the thrust member 17, enabling the water contained in the tub 4 to flow into the hollow body 1 at an appropriate rate through the open inlet 8. The water flows toward the suction side of the pump, as a result. During an initial transient phase, water that may possibly be contained in the vent pipe 13 and the tubeing in 14 is slowly taken in by the pump through the calibrated opening 16, thereby preventing the correct priming of the recirculating pump from being substantially altered.

In the above-described way, the intake mouth switches into the operating state that is illustrated in FIG. 2. In this state, the moving member 10 causes the shutter 12 to close the calibrated opening 16. The intake mouth can therefore operate normally, enabling a substantial flow of water to take place from the tub 4 to the recirculating pump through the open inlet 8 and the outlet 3.

Through the proper sizing of the various component parts, a matter which is well within the usual capability of those skilled in the art, the intake mouth is structured and arranged so as to be able to operate and respond in the manner described below and so as to maintain constant safe operating conditions in the case where foreign matter, for example the hair of a person taking a bath, adheres to the screening grill 7, thereby reducing the water flow cross-sectional area directed toward the inlet 8, correspondingly.

Thus, when the water flow toward the inlet 8 falls below a predetermined threshold value, corresponding to a condition of substantial clogging of the screening grill 7, the water flow is no longer able to exert a sufficient thrust on the sensor 11, as is normally required to overcome the force of the thrust member 17. The thrust member 17 therefore causes the moving member 10 to be displaced towards the rest position illustrated in FIG. 1. The calibrated opening 16, as a result, is opened, and communicates with the outlet 3. The outlet 3, accordingly, takes in ambient air through the vent pipe 13 and the remaining venting arrangement 14-16. In a per se known manner, this leads to the condition in which the recirculating pump becomes substantially unprimed, that is, deactivated. This of course facilitates the separation and removal of foreign matter from the screening grill 7, enabling the restoration of normal operating conditions.

It is apparent from the above description that the intake mouth actually ensures a full operational reliability and safety, because the recirculation pump becomes unprimed, that is, deactivated, automatically when ever a dangerous clogging condition occurs on any portion or zone of the screening grill 7, further adding to the simplicity in construction of operation of the intake mouth. Advantageously, the displacement of the moving member 10 is not controlled by a partial flow of water passing through a localized area of the screening grill 7, but rather by the variation in the total flow of water that passes through the entire cross-sectional area of the screening grill 7.

Other various modifications to the intake described above and in accordance with the present invention would be apparent to those of skill in the art and should be considered within the scope of the present invention as defined by the appended claims.

I claim:

1. A water intake, comprising:

a hollow body having a water inlet, a water outlet and a hollow interior communicating said inlet with said outlet;

a vent extending from outside of said hollow body to a position in said hollow interior so as to allow communication of said hollow interior with the outside of said hollow body; and a shutter operable for movement between a rest position in which said hollow interior is in fluid communication with said vent and an operating position in which said shutter closes said vent off from said hollow interior, said shutter being constructed to be responsive to a flow of water from said inlet to said outlet to move to said operating position to close said vent until the flow of water falls below a threshold value, and to be responsive to the flow of water falling below the threshold value to move to said rest position so that said vent comes into fluid communication with said hollow interior.

2. An intake, comprising:

a hollow body having an inlet, an outlet and a hollow interior communicating said inlet with said outlet;

a vent extending from outside of said hollow body to a position in said hollow interior so as to allow communication of said hollow interior with the outside of said hollow body;

a shutter operable between a rest position in which said hollow interior is in fluid communication with said vent and an operating position in which said shutter closes said vent off from said hollow interior, said shutter being adapted to be in said operating position to close said vent during a flow of water from said inlet to said outlet until the flow of water falls below a threshold value, at which point said vent comes into fluid communication with said hollow interior;

wherein said shutter comprises a movable member biased by a spring to said rest position and a sensor adapted to be actuated by the flow of water to displace said movable member against the force of said spring to said operating position; and wherein said sensor comprises a member which closes said inlet when said movable member is in said rest position.

3. An intake for a bathtub, comprising:

a water inlet, an interior and an outlet adapted to be connected to a pump, for the flow of water from said inlet, through said interior, to said outlet;

a vent communicating with said interior and extending outside thereof for communicating with ambient air;

a shutter constructed such that said shutter is capable of being switched from a first condition in which said outlet communicates with said vent to an operating condition in response to a flow of water being caused to flow toward said outlet, said shutter substantially shutting said vent in said operating condition, wherein said shutter is further constructed so as to switch from said operating condition to said first condition when the flow of water falls below a predetermined threshold value so as to enable ambient air to enter said interior through said vent.

4. An intake for a bathtub, comprising:

a water inlet, an interior and an outlet adapted to be connected to a pump, for the flow of water from said inlet, through said interior, to said outlet;

a vent communicating with said interior and extending outside thereof for communicating with ambient air; and means for substantially shutting said vent in response to a flow of water being caused to move toward said outlet and for opening said vent when the flow of water falls below a predetermined threshold value so as to enable ambient air to enter said interior through said vent.

* * * * *